Patented Jan. 6, 1931

1,788,295

UNITED STATES PATENT OFFICE

WINFRID HENTRICH AND MAX HARDTMANN, OF WIESDORF-ON-THE-RHINE, RUDOLF KNOCHE, OF LEVERKUSEN-ON-THE-RHINE, AND JOSEF HILGER, OF COLOGNE-MULHEIM, GERMANY, ASSIGNORS TO GENERAL ANILINE WORKS, INC., OF NEW YORK, N. Y., A CORPORATION OF DELAWARE

DIS AND POLY AZODYESTUFFS

No Drawing. Application filed May 29, 1928, Serial No. 281,586, and in Germany June 10, 1927.

The present invention relates to new dis- and polyazodyestuffs and to a process of preparing same.

We have found that heretofore unknown dis- and polyazodyestuffs which probably correspond to the general formula:

$$R_1-NH-X-NH-R_2$$

wherein X represents the radical of a heterocyclic compound, $R_1$ and $R_2$ stand for residues of any desired azo compounds, the —NH— groups being linked to carbon atoms, are valuable products for dyeing purposes.

These dyestuffs may be prepared by condensing two similar or dissimilar molecules of amino-azo-compounds with such a heterocyclic compound as contains two successively replaceable halogen atoms; or the latter compounds may be condensed with one molecule of an amino-azo-compound and one molecule of an amino componuds, the radical of which is capable of coupling with diazo compounds after the condensation, and reacting upon these condensation products with diazo-compounds. Thereby it is to be understood that the sequence of reacting upon the dihalogen-heterocyclic compounds with the two components may be changed about without departing from our invention. Also it is possible to prepare such dyestuffs by reacting upon a heterocyclic compound of the kind above referred to with one molecule of a compound of the kind $$NH_2-C_6H_4-NH_2; NH_2-C_6H_3\!\!<\!\!^{NH_2}_{SO_3H}; NH_2-C_6H_4-NO_2;$$

$$NH_2-C_6H_4-N\!\!<\!\!^H_{ac} \quad (ac=\ -C\!\!<\!\!^O_H;-COCH_3;-CO.COOH)$$

or the like replacing the second halogen atom by the residue of an amino azo compound and then diazotizing, if necessary, after reduction or saponification, and coupling with any desired coupling component. Obviously the preparation of these dyestuffs is not limited to the methods above described but the latter are only mentioned by way of example.

Among the heterocyclic compounds containing two successively replaceable halogen atoms the following may, for example, be mentioned:

5-chloro-nicotinic acid chloride, trichloropurine, trichloropyrimidine, methyl-dichloro-pyrimidine, phenyl-dichloro-pyrimidine, dichloro-benzopyridazine, dichloro-aceto-guanamide, 2.4-dichloro-quinazoline, 4.4′-dichloro-6.6′-diphenyl-1.1′-, 3.3′-bis-diazine, 2-phenyl-(3′-carbonic acid chloride)-4-chloroquinazoline, 2.4.7-trichloro-quinazoline, 2.4-dichloro-5.7-dibromo-quinazoline, 1-phenyl-(4′-carboxylic acid chloride)-4-chloro-phtha-azine, 2-chloro-quinoxaline-3-carboxylic acid chloride, 2.3-dichloro-quinoxaline-6-carboxylic acid chloride, 2.4-dichlorocopazoline, 2.4-dichloro-benzo-10-monazine-1.3-diazine (cf. Berichte der deutschen Chemischen Gesellschaft, vol. 34, page 1341) and 2.4-dicholor-1.3-diazine-5.8-diazine.

The following are examples of compounds which, as described above, may be employed for the introduction of aminoazo residues: the mono acidyl-arylene diamines, phenylene diamine, the 3- or 4-nitro-aryl amines and the 3- or 4-arylene diamine sulfonic acids.

The following are examples of amino compounds the radical of which is capable of coupling with a diazo compound after the condensation: Amino hydroxy compounds of the naphthalene series, such as aminonaphtholsulfonic acids, naphthalenediamines, such as 1.8-naphthalenediamine-4-sulfonic acid and substitution products thereof, and also aminoaryl-pyrazolones with an unoccupied 4-position in the pyrazolone ring.

The products thus obtainable may be symmetrical or unsymmetrical ones, but we prefer the latter type, especially those which correspond to the probable general formula:

$$R_1-N=N-R_2-N=$$
$$N-R_3-NH-X-NH-R_4-N=N-R_5$$

wherein X represents the residue of a heterocyclic compound, $R_1$ the residue of a compound of the group comprising sulfo- and carboxylic acids of the benzene and naphthalene series, the nuclei of which may be further substituted, $R_2$ the residue of a compound of the benzene or naphthalene series, $R_3$ the residue of such a naphthol sulfonic acid compound as couples in o-position to the OH group, $R_4$ the residue of a compound of the benzene series and $R_5$ the residue of a compound of the group comprising salicylic acid, the nucleus of which may be further substituted, and compounds containing a CH$_2$—group capable of coupling with diazo-compounds, such as pyrazolones with an unoccupied 4-position in the pyrazolone ring, the —NH—groups being linked to carbon atoms in accordance with the valuable properties of the dyeings obtainable by means of these dyestuffs.

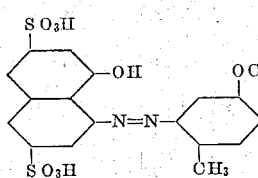

All these dyestuffs which correspond to the general formula:

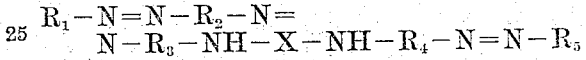

represent dark powders, soluble in water in form of their alkali metal salts with bluish green to green colorations, dyeing cotton clear bluish green to green shades of good fastness especially to light. When carefully reducing our new dyestuffs with stannous chloride and hydrochloric acid they yield among other products a compound of the general formula:

wherein X stands for the radical of a heterocyclic compound, R$_3$ and R$_4$ represent aromatic residues each containing at least one amino group.

The following examples illustrate our invention, without limiting it thereto:

*Example 1.*—A concentrated aqueous solution is produced from 822 parts by weight of the tri-sodium salt of the condensation product obtained in accordance with the application Ser. No. 240,074 from one molecule of 2.4-dichloro-quinazoline, one molecule of 1-amino-8-hydroxy-naphthalene-3.6-disulfonic acid and one molecule of 4-amino-5′-methoxy-4′-hydroxy-azobenzene-3′-carboxylic acid. (The latter compound can be produced by saponifying the azo dyestuff obtained from diazotized 4-amino-phenyl-oxaminic acid and 3-methoxy-2-hydroxybenzene-1-carboxylic acid, the so-called guaiacol carboxylic acid). 1100 parts by volume of commercial pyridine are added to the clear reddish yellow solution, the whole is cooled to 5° C. and coupled with 503 parts by weight of the diazo compound of the aminoazo body from 1-amino-8-hydroxy-naphthalene-3.6-disulfonic acid and 3-amino-4-cresolethyl-ether. The formation of the dyestuff begins at once accompanied by a deep greenish yellow coloration of the solution and is soon complete. The new dyestuff dyes cotton green shades of very satisfactory fastness to light.

The dyestuff has in its free form the probable formula:

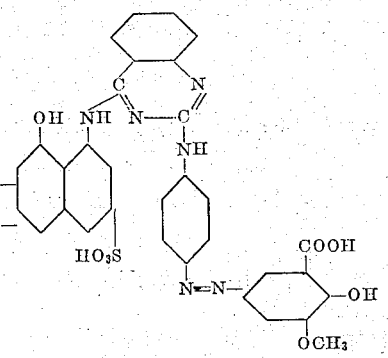

When carefully reducing it by means of stannous chloride and hydrochloric acid, it yields among other products a compound of the probable formula:

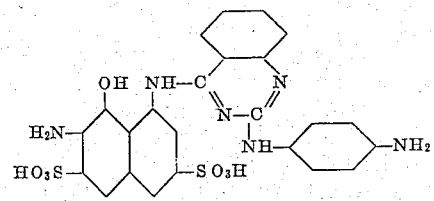

A clear green which is likewise very fast to light is obtained as follows: The condensation product obtained in accordance with the application Ser. No. 240,074 from one molecule of 2.4-dichloro-quinazoline, one molecule of 1-amino-2-hydroxynaphthalene-3.6-disulfonic acid and one molecule of 4-amino-phenyl oxaminic acid is coupled with the monoazo dyestuff from one molecule of 1-amino-8-hydroxynaphthalene-4.7-disulfonic acid and 3-amino-4-cresol-hydroxy-ethyl-ether. The oxalic acid residue is then removed by saponification with excess caustic soda solution. The resulting product is again diazotized (at about 30° C.) and coupled in the presence of sodium carbonate with the acetoacetic acid ortho-chloroanilide mono-sulfonic acid, obtained according to the application Ser. No. 234,031. A similar dyestuff can also be produced on the fibre by developing with methyl-phenyl-pyrazolone, a green shade of very satisfactory fastness to washing and light being obtained.

The process may likewise be carried out by first saponifying the condensation product from one molecule of 2.4-dichloro-quinazoline, one molecule of 1-amino-8-hydroxynaphthalene-3.6-disulfonic acid and one molecule of 4-amino-phenyl-oxaminic acid, diazotizing the saponification product, then coupling, advantageously in the presence of sodium acetate, with the mono-sulfonic acid of aceto-acetic acid-2-chloro-anilide, and coupling the yellow monoazo dyestuff, isolated in the customary manner, with the diazo compound from 1-amino-8-hydroxy-naphthalene-4.7-disulfonic acid and 5-amino-4-cresol-hydroxy-ethyl-ether. Finally the same valuable dyestuff is obtained by coupling the saponified condensation product from one molecule of 2.4-dichloro-quinazoline, one molecule of 1-amino-8-hydroxy-naphthalene-3.6-disulfonic acid and one molecule of 4-amino-phenyl-oxaminic acid with the diazo compound from 1-amino-8-hydroxynaphthalene-4.7-disulfonic acid and 3-amino-4-cresol-hydroxy-ethyl-ether, further diazotizing and coupling in the presence of sodium carbonate with the aceto-acetic acid ortho-chloro-anilide-mono-sulfonic acid.

Moreover, green to olive green tetrakisazo dyestuffs of excellent fastness to light are obtained by coupling the condensation product from one molecule of 2.4-dichloro-quinazoline, one molecule of 2-amino-5-hydroxy-naphthalene-7-sulfonic acid and one molecule of an aminoazo compound, obtained by saponifying an azo dyestuff from 4-amino-acetanilide and a pyrazolone, especially the 1-(2'-sulfophenyl-3-methyl-5-pyrazolone with diazo disazo compounds, such for example as that from aniline-2.5-disulfonic acid azo-1-amino-naphthalene-7-sulfonic acid-azo-1-amino-naphthalene and the like.

The 2.4-dichloro-quinazoline used in the above example can be replaced by similarly constituted halogen derivatives of other heterocyclic compounds, in which the heterocyclic ring is united to a carbocyclic ring, such for example as 1.4-dichloro-phthalazine and the like. Compounds of this kind have been enumerated among others in the body of this application.

*Example 2.*—732 parts by weight of the sodium salt of the condensation product (obtained by successive replacement of the two halogen atoms) from one molecule of methyl-dichloro-pyrimidine, one molecule of 4-amino-4'-hydroxyazobenzene-3'-carboxylic acid, and one molecule of 1-amino-8-hydroxynapthalene-3.6-disulfonic acid, are dissolved with the addition of exactly the necessary quantity of aqueous ammonia in the smallest possible quantity of hot water. The above mentioned product is obtained by condensing one molecule of methyl-dichloro-pyrimidine with one molecule of the mono sodium salt of 4-amino-4'-hydroxy-azobenzene-3'-carboxylic acid in aqueous solution at about 50° C. and then decomposing the intermediate compound, which still contains a reactive halogen atom, with one molecule of the acid sodium salt of 1-amino-8-hydroxy-naphthalene-3.6-disulfonic acid in the presence of excess sodium acetate at a raised temperature. The compound has the following properties:

It is a greyish yellow powder, soluble in water with a pure yellow coloration, when coupled in the presence of sodium carbonate with diazotized sulfanilic acid, a red dyestuff is obtained.

1,000 parts by volume of pyridine are now added, the solution is cooled to 5° C. and, while stirring well an ice cold paste of the diazo compound, obtained in the known manner from 503 parts by weight of the dyestuff from 1-amino-8-naphthol-3.6-disulfonic acid and 3-amino-4-cresol-ethyl-ether is introduced in a thin stream. Coupling begins at once accompanied by a deep green coloration of the solution and is soon complete. The solution is then diluted with a little water, the new product is salted out and worked up in the customary manner. The new dyestuff dyes cotton, for example, from a sodium sulfate-sodium carbonate bath, bluish green shades of very good fastness to light.

Instead of the aminoazo compound mentioned, obtained from 1-amino-8-hydroxy-naphthalene-3.6-disulfonic acid and 3-amino-4-cresol-ether, there can be used the aminoazo compound obtained from the sulfuric acid ester of 1-amino-4-cresol-hydroxy-ethyl-ether (cf. U. S. Patent 1,644,524) or that from 1-amino-8-hydroxy-naphthalene-4.7- (or 6-)-disulfonic acid or also from 1-amino-8-hydroxynaphthalene-5.7-disulfonic acid and 3-amino-4-cresol-methyl-ether or that from 1-amino-8-hydroxy-naphthalene-4- (or 6-)-mono-sulfonic acid and the above mentioned sulfuric acid ester of 3-amino-4-cresol-hydroxy-ethylether or also in particular the aminoazo compound from diazotized 1-amino-8-hydroxy-naphthalene-4-sulfo-6-carboxylic acid and the β-(2-amino-4-methyl-phenoxy)-propionic acid of the formula:

By replacing the aminoazo compounds of the type mentioned by other aminoazo compounds, such, for example, as that from aniline-2-sulfonic acid (or 4-amino-acet-anilide-3-sulfonic acid) and 1-amino-naphthalene or that from 2-amino-naphthalene-8-sulfonic acid or also from 1-amino-8-methoxy-naphthalene-3.6-disulfonic acid and 1-amino-naphthalene or other suitable middle components of the benzene or naphthalene series, dyestuffs are obtained likewise dyeing cotton green and possessing very satisfactory fastness properties.

The shade of the dyestuffs of the above example becomes more yellow by using instead of the condensation product therein employed, that, for example, from one molecule of methyl-dichloro-pyrimidine, one molecule of 1-amino-8-hydroxy-naphthalene-3.5-disulfonic acid and one molecule of 4-amino-2-methoxy-5'-methyl-4'-hydroxyazobenzene-3'-carboxylic acid (obtained, for example, by partial reduction of a monoazo dyestuff derived from 5-nitro-2-amino-anisol-orthocresotinic acid) or of an aminoazo compound of similar constitution.

Instead of the methyl di-chloro-pyrimidine there can be used with the same success heterocyclic compounds of similar constitution possessing two successively replaceable halogen atoms. The aminoazo compound may then be first condensed, as in the above example, or also, for example, an amino-hydroxynaphthalene sulfonic acid may first be brought into reaction. A number of such compounds having different reactive halogen atoms is mentioned above.

benzene-2.5-disulfonic acid, 1-aminonaphthalene-7-sulfonic acid and 1-aminonaphthalene, coupled in alkaline solution of 2-amino-5-hydroxy-naphthalene-7-sulfonic acid. The solution is heated to 80–85° C. with thorough stirring. There is then slowly dropped in with very efficient stirring the solution obtained as described above of the condensation product from one molecule of 2.4-dichloro-quinazoline and one molecule of 4-amino-3-methoxy-azobenzene-5'-sulfo-3'-carboxylic acid, which still contains a reactive halogen atom. The temperature must be kept constant between 80 and 85° C. Since the condensation proceeds rather sluggishly the addition of a catalyst, say, of potassium bromide, is advantageous. When all the liquid has been added heating is continued for another hour at 85–90° C. when the product is salted out and filtered. The new dyestuff possessing in the form of the free acid probably the following formula:

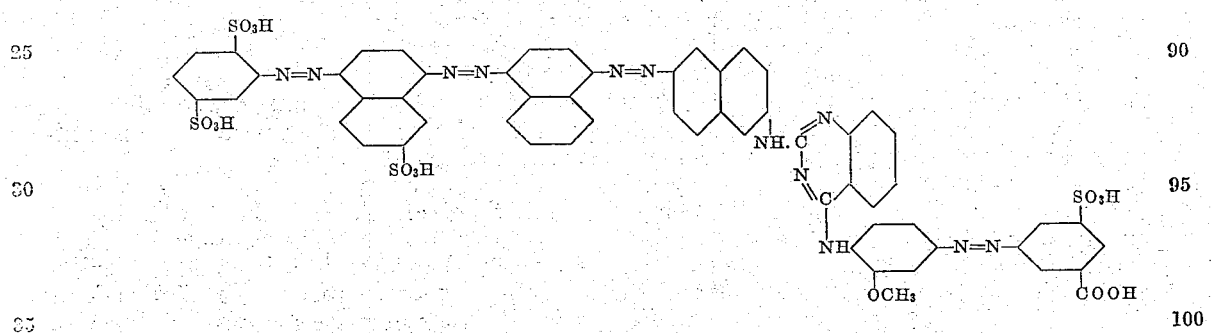

*Example 3.*—395 parts by weight of the disodium salt of 4-amino-3-methoxy-azobenzene-5'-sulfo-3'-carboxylic acid are dissolved in the least possible amount of water 198 parts by weight of 2.4-dichloro-quinazoline are introduced into this solution at 40° C. with efficient stirring, a little acetone is added and the temperature is maintained at 40° C. with continued stirring until all the dichloro-quinazoline has disappeared and no unchanged aminoazo compound can be detected by a diazotization test or by an attempt to couple the same with an alkaline solution of sodium 2-hydroxynaphthalene-3.6-disulfonate. In the meantime the most concentrated aqueous solution is prepared from 980 parts by weight of the sodium salt of the pure tertiary aminotrisazo dyestuffs, produced in the known manner from 1-aminois in the pure state a dark powder with a metallic surface lustre. It dyes cotton, for example, from a sodium sulfate bath, green shades of very satisfactory fastness to light.

Dyestuffs of the same type can be obtained, for example, as follows: The condensation product produced in an analogous manner to that used in the above process from one molecule of 2.4-dichloro-quinazoline, one molecule of the trisazo dyestuff obtained from 1-amino-benzene-2.5 disulfonic acid, 1-amino-naphthalene-7-sulfonic acid a second molecule of the same compound and 2-amino-5-hydroxynaphthalene-7-sulfonic acid (coupled whilst alkaline) and one molecule of 4-amino-phenyl-oxaminic acid is saponified by means of an excess of sodium hydroxide with heating. The resulting amino compound, of the probable formula:

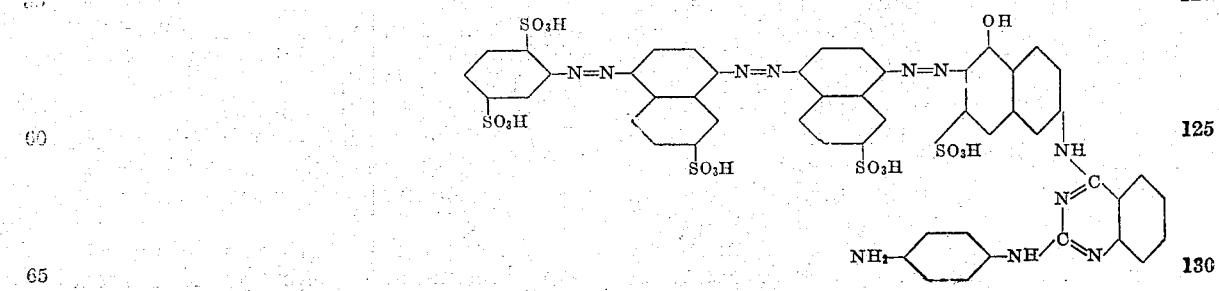

is again diazotized at ordinary temperature, advantageously while fairly diluted and the diazo-trisazo compound, after being filtered, is coupled at about 20° C. in the presence of sodium carbonate with 1-(2'-carboxy-5'-chloro-phenyl)-3-methyl-5-pyrazolone. Cotton is dyed a green shade from a sodium sulfate bath, possessing very satisfactory fastness to light; the dyestuff dyes well on cotton.

*Example 4.*—The diazo compound obtained in the customary manner from 307 parts by weight of the aminoazo compound from 3-amino-2-hydroxy-benzoic acid and 1-aminonaphthalene is coupled in the presence of sodium carbonate with 732 parts by weight of the condensation product used in Example 2 and obtained from one molecular proportion of methyl-dichloropyrimidine, one molecular proportion of 1-amino-8-hydroxy-naphthalene-3.6-disulfonic acid and one molecular proportion of 4-amino-4'-hydroxy-azobenzene-3'-carboxylic acid. The new dyestuff dyes cotton from a sodium sulfate-sodium-carbonate bath, green shades, which on after-treatment with copper salts change to a deep olive green of excellent fastness to washing and light.

By replacing in this example the diazo-azo-compound from 3-amino-2-hydroxybenzoic acid and 1-amino-naphthalene by that from 4-amino-1.3-dimethyl-benzene-5-sulfonic acid and 1-amino-2-naphthol-ethyl-ether-6-sulfonic acid, a tisazo dyestuff is produced which yields on cotton pure green shades of very satisfactory fastness to light.

*Example 5.*—An aqueous paste is prepared of 733 parts by weight of the condensation product obtained from one molecule of dichloro-aceto-guanamide, one molecule of 1-amino-8-hydroxynaphthalene-3.6-disulfonic acid and one molecule of 4-amino-4'-hydroxy-azobenzene-3'-carboxylic acid. On the addition of 1,000 parts by volume of pyridine, solution takes place with a reddish yellow coloration. The solution is cooled to 0° C. and stirred well during the addition in small portions of an ice cold paste of the diazo compound, prepared in the known manner, from 467 parts by weight of the dyestuff from 1-amino-8-hydroxy-naphthalene-3.6-disulfonic acid and 3-amino-4-cresol-methyl-ether. The coupling begins at once accompanied by a deep green coloration and is soon complete. The working up is effected as in Example 2. The new dyestuff dyes cotton, for example, from a sodium sulfate-sodium carbonate bath, in clear green shades, very fast to light; it is also very suitable for the dyeing of mixed wool and cotton materials.

The condensation product used in this example as the coupling component is produced by first treating (at about 30° C.) molecular quantities of dichloro-aceto-guanamide (obtainable, for example, by means of the chlorides of phosphorus from the known aceto-guanamide; the melting point is 97 to 98° C.) with 1-amino-8-hydroxy-naphthalene-3.6-disulfonic acid, then again treating (at 60–70° C.) with 4-amino-4'-hydroxy-azobenzene-3'-carboxylic acid the intermediate compound formed, which still contains a reactive chlorine atom. The new compound is a yellow powder, soluble in water with a pure yellow coloration. Coupled with diazo-benzene in sodium carbonate solution it forms a red dyestuff.

By replacing in the above example the diazo component obtained from the azo compound from 1-amino-8-hydroxynaphthalene-3.6-disulfonic acid and 3-amino-4-cresol-methyl-ether by that from 4-amino-toluene-3-sulfonic acid and 1-amino-2-ethoxy-naphthalene-6-sulfonic acid, a dyestuff is produced, dyeing cotton pure fast green shades. By using however, as the diazo component the amino-azo compound from 3-amino-2-hydroxy-benzoic acid and 1-amino-naphthalene, a dyestuff is obtained, dyeing cotton from a sodium sulfate-sodium carbonate bath bluish green; by after-treatment of this dyeing with copper salts a beautiful full yellowish green of excellent fastness to washing and light results. A green of similar properties is produced by dyeing cotton from the sodium sulfate-sodium carbonate bath with the trisazo dyestuff obtained, as in the above example, from 2-amino-4'-hydroxy-3'-carboxy-diphenylsulfone-4-sulfonic acid, 1-amino-naphthalene and the condensation product of dichloro-aceto-guanamide, 1-amino-8-hydroxy-naphthalene-3.6-disulfonic acid and 4-amino-4'-hydroxyazobenzene-3'-carboxylic acid and then treating the dyeing with copper salts.

*Example 6.*—The diazo compound obtained from 107 parts by weight of 4-amino-toluene is coupled at 0° C. advantageously with the addition of a little pyridine, with a sodium carbonate solution of 822 parts by weight of the condensation product described in Example 1 and obtained from one molecule of 2.4-dichloroquinazoline, one molecule of 1-amino-8-hydroxynaphthalene-3.6-disulfonic acid and one molecule of 4-amino-5'-methyl-4'-hydroxy-azobenzene-3'-carboxylic acid. The dyestuff after working up in the customary manner dyes cotton red shades of satisfactory fastness to light.

*Example 7.*—The diazodisazo compound produced in the known manner from 685 parts by weight of the disazo dyestuff from aniline-2-sulfonic acid; 1-aminonaphthalene-7-sulfonic acid and 1-amino-2-ethoxy-naphthalene-6-sulfonic acid is coupled at −5° C. in the presence of much pyridine with 464 parts by weight of the reduced condensation product from one molecule of 5-chloro-nicotinic acid chloride, one molecule of 2-amino-5-hydroxynaphthalene-7-sulfonic acid and one molecule of 3-nitro-1-methyl-aminobenzene. When the formation of the dyestuff is complete, much water is added and the dyestuff is salted out. After purification by redissolving once (advantageously in the presence of a little ammonia) it dyes cotton blue shades; by diazotization and development with methyl-phenyl-pyrazolone green shades are produced fast to washing, light and topping.

The reduced condensation product of the probable formula:

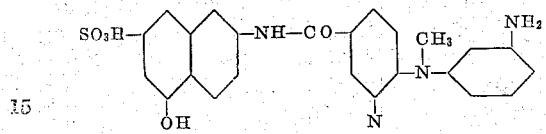

used in this example as coupling component, is produced by condensing at a low temperature molecular quantities of 5-chloro-nicotinic acid chloride and 2-amino-5-hydroxy-naphthalene-7-sulfonic acid, then replacing the halogen atom in the nucleus by 3-nitro-1-methyl-aminobenzene under pressure in a stirring autoclave in the presence of sodium acetate and advantageously of a little dioxane and then reducing the nitro group, for instance, with iron and acetic acid.

The condensation product used in the above example may be replaced by that from one molecule of dichloro-aceto-guanamide, one molecule of 1-amino-8-hydroxy-naphthalene-3.6-disulfonic acid and one molecule of 3-nitro-aniline with subsequent reduction for example, by iron and acetic acid; the resulting compound is a grey powder, soluble in water with a yellowish coloration, it can be diazotized and the diazo compound gives on pouring into sodium carbonate a red dyestuff. On coupling this compound with the amino-azo compound from 4.5-dichloro-aniline-2-sulfonic acid and 1-amino-2-ethoxy-naphthalene-6-sulfonic acid after diazotizing in the known manner a disazo dyestuff is produced, dyeing cotton a pure blue; diazotized on the fibre and developed with methyl-phenyl-pyrazolone a pure green fast to washing and light results.

*Example 8.*—199 parts by weight of 4.6-dinitro-2-amino-1-hydroxy-benzene are diazotised and coupled at +5° C. with a sodium carbonate solution of 601 parts by weight of the condensation product from one molecule of dicholoro-aceto-guanamide, one molecule of 2-amino-5-hydroxy-naphthalene-7-sulfonic acid and one molecule of 4-amino-5'-methyl-4'-hydroxy-azobenzene-3'-carboxylic acid (the preparation is analogous to that of the coupling component used in Example 5). The coupling is soon complete. The dyestuff after working up in the customary manner dyes cotton yellowish brown shades, which change on after-treatment with copper salts into a brown of very satisfactory fastness to light and washing. A yellow of the same properties is obtained by coupling the dyestuff from the condensation product of one molecule of dicholoro-aceto-guanamide, one molecule of 4-amino-2-sulfo-4'-hydroxy-azobenzene-3'-carboxylic acid and one molecule of 1-(3'-amino-)-phenyl-3-methyl-5-pyrazolone with diazotized 3-amino-2-hydroxy-benzoic acid in sodium carbonate solution.

We claim:

1. Process, which comprises reacting upon such a heterocyclic compound as contains two successively replaceable halogen atoms with one molecule of an amino-azo-compound and one molecule of an amino compound, the radical of which is capable of coupling with diazo compounds after the condensation, and reacting upon these condensation products with a diazo compound.

2. Process, which comprises reacting upon such a heterocyclic compound as contains two successively replaceable halogen atoms with one molecule of an amino-azo-compound of the benzene series containing sulfo- or carboxylic acid groups, and one molecule of such an aminonaphthol sulfonic acid compound as couples in o-position to the OH-group and coupling these condensation products with a diazotized amino-azo-compound.

3. Process, which comprises reacting upon such a heterocyclic compound as contains two successively replaceable halogen atoms with one molecule of a compound of the probable formula:

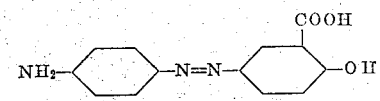

wherein the benzene nuclei may be otherwise substituted and one molecule of such a peri-aminonaphthol-sulfonic acid as couples in o-position to the OH-group, and reacting upon these condensation products with a diazotized compound of the probable formula:

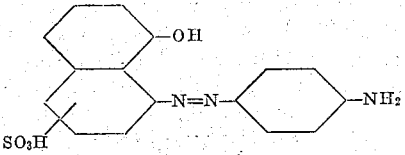

wherein the arylnuclei may be otherwise substituted.

4. Process, which comprises reacting upon a compound of the group comprising such diazines and triazines as contain two successively replaceable halogen atoms with one molecule of an amino-azo-compound and one molecule of an amino compound, the radical of which is capable of coupling with diazo compounds after the condensation, and reacting upon these condensation products with a diazo compound.

5. Process, which comprises reacting upon a compound of the group comprising such diazines and triazines as contain two successively replaceable halogen atoms with one molecule of an amino-azo-compound of the benzene series containing sulfo- or carboxylic acid groups, and one molecule of such an aminonaphthol sulfonic acid compound as couples in o-position to the OH-group and coupling these condensation products with a diazotized amino-azocompound.

6. Process, which comprises reacting upon a compound of the group comprising such diazines as contain the heterocyclic ring system condensed with a benzene ring; and which contain two successively replaceable halogen atoms, with one molecule of a compound of the probable formula:

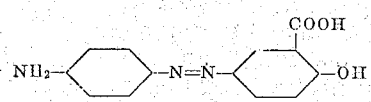

wherein the benzene nuclei may be otherwise substituted and one molecule of such a peri-aminonaphthol-sulfonic acid as couples in o-position to the OH-group, and reacting upon these condensation products with a diazotized compound of the probable formula:

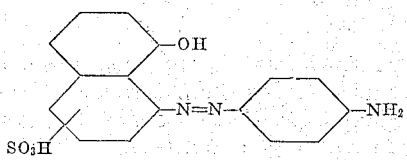

wherein the aryl nuclei may be otherwise substituted.

7. Process, which comprises reacting upon 2.4-dichloroquinazoline of the probable formula:

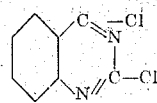

with one molecule of the compound of the probable formula:

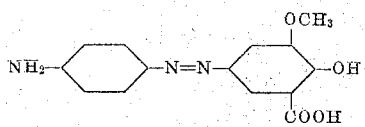

and one molecule of 1-amino-8-hydroxy-naphthalene-3.6-disulfonic acid and coupling this condensation product with one molecule of a diazotized compound of the probable formula:

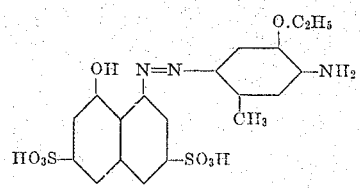

8. Azodyestuffs of the probable general formula:

$$R_1-NH-X-NH.R_2$$

wherein X represents the residue of a heterocyclic compound, $R_1$ and $R_2$ stand for the residues of any desired azo compounds, the NH-groups being linked to carbon atoms, said products being strongly colored powders, yielding on careful reduction with stannous chloride, and hydrochloric acid among other products a compound of the general formula:

$$R_4-NH-X-NH-R_3$$

wherein X represents the residue of a heterocyclic compound, $R_3$ and $R_4$ stand for the residues of aromatic compounds, each containing at least one amino group, the NH-groups being linked to carbon atoms.

9. Azodyestuffs of the probable general formula:

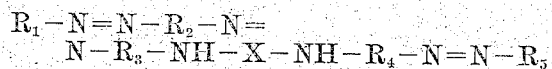

wherein X represents the residue of a heterocyclic compound, $R_1$ the residue of a compound of the group consisting of sulfo- and carboxylic acids of the benzine and naphthalene series, the nuclei of which may be further substituted, $R_2$ the residue of a compound of the benzene or naphthalene series, $R_3$ the residue of such a naphthol sulfonic acid compound as couples in o-position to the OH—group, $R_4$ the residue of a compound of the benzene series and $R_5$ the residue of a compound of the group consisting of salicyclic acid, the nucleus of which may be further substituted and compounds containing a —$CH_2$— group capable of coupling with diazocompounds, the —NH— groups being linked to carbon atoms; said dyestuffs being dark powders, soluble in water in form of their alkali metal salts with bluish-green to green to olive-green colorations, yielding on careful reduction with stannous chloride and hydrochloric acid amount other products a compound of the probable general formula:

$$R_6-NH-X-NH-R_7$$

wherein X represents the residue of a heterocyclic compound, $R_6$ means the residue of an aminonaphtholsulfonic acid compound and $R_7$ the residue of a compound of the benzene series containing an amino group; the —NH— groups being linked to carbon atoms.

10. Azodyestuffs having in their free form the probable general formula:

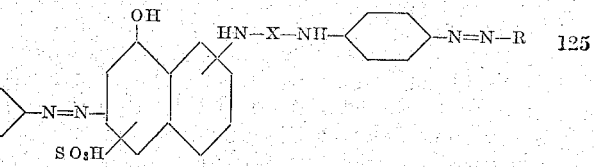

wherein X represents the residue of a heterocylic compound, R stands for the residue of a compound of the group consisting of salicylic acid and compounds containing a —CH$_2$— group capable of coupling with diazo-compounds, and wherein the aromatic nuclei may be further substituted, the —NH— groups being linked to carbon atoms; said products being dark powders, soluble in water in form of their alkali metal salts with green colorations, yielding on careful reduction with stannous chloride and hydrochloric acid among other produces a compound of the probable formula:

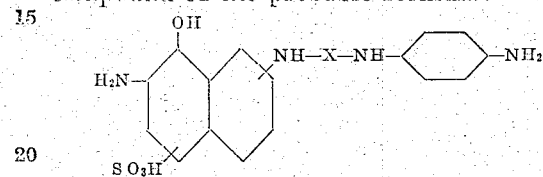

wherein X stands for the residue of a heterocylic compound and wherein the aromatic nuclei may be further substituted, the —NH— groups being linked to carbon atoms.

11. Azodyestuffs of the probable general formula:

$$R_1-NH-X-NH-R_2$$

wherein X represents the residue of a compound of the group consisting of diazines and triazines, $R_1$ and $R_2$ stand for the residues of any desired azo compounds, the —NH— groups being linked to carbon atoms, said products being strongly colored powders, yielding on careful reduction with stannous chloride and hydrochloric acid among other products a compound of the general formula:

$$R_3-HN-X-NH-R_4$$

wherein X represents the residue of a compound of the group consisting of diazines and triazines, $R_3$ and $R_4$ stand for the residues of an aromatic compound, each containing at least one amino-group, the —NH— groups being linked to carbon atoms.

12. Azodyestuffs of the probable general formula:

$$R_1-N=N-R_2-N=N-R_3-$$
$$NH-X-NH-R_4-N=N-R_5$$

wherein X represents the residue of a compound of the group consisting of diazines and triazines, $R_1$ the residue of a compound of the group consisting of sulfo- and carboxylic acids of the benzene and naphthalene series, the nuclei of which may be further substituted, $R_2$ the residue of a compound of the benzene or naphthalene series, $R_3$ the residue of such a naphthol sulfonic acid compound as couples in o-position to the OH-group, $R_4$ the residue of a compound of the benzene series and $R_5$ the residue of a compound of the group consisting of salicylic acid, the nucleus of which may be further substituted and compounds containing a —CH$_2$— group capable of coupling with diazo compounds, the —NH— groups being linked to carbon atoms; said dyestuffs being dark powders, soluble in water in form of their alkali metal salts with bluish-green to green colorations, yielding on careful reduction with stannous chloride and hydrochloric acid among other products a compound of the probable general formula:

$$R_6-NH=X-NH-R_7$$

wherein X represents the residue of a compound of the group consisting of diazines and triazines, $R_6$ means the residue of an aminonaphthol-sulfonic acid compound and $R_7$ the residue of a compound of the benzene series containing an amino group; the —NH— group being linked to carbon atoms.

13. Azodyestuffs having in their free form the probable general formula:

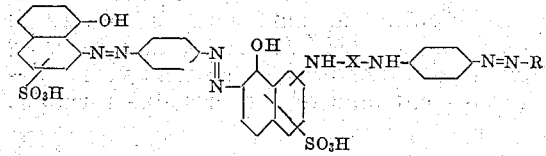

wherein X represents the residue of such a diazine as contains the heterocyclic ring system condensed with a benzene ring, R stands for the residue of a compound of the group consisting of salicyclic acid and compounds containing a —CH$_2$— group capable of coupling with diazocompounds and wherein the aromatic nuclei may be further substituted, the —NH— groups being linked to carbon atoms said products being dark powders, soluble in water in form of their alkali metal salts with green colorations, yielding on careful reduction with stannous chloride and hydrochloric acid among other products a compound of the probable formula:

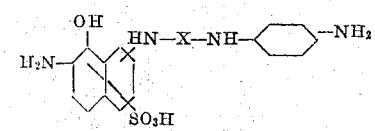

wherein X represents the residue of such a diazine as contains the heterocyclic ring system condensed with a benzene ring and wherein the aromatic nuclei may be further substituted.

14. The azodyestuffs having in its free form the probable general formula:

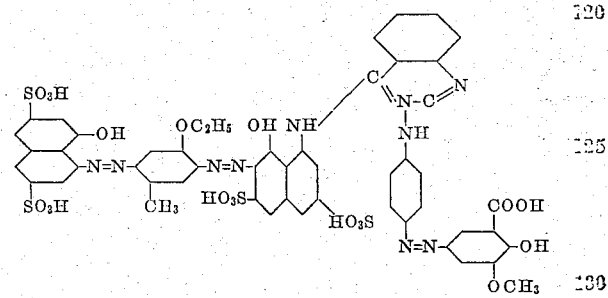

said dyestuff being a dark powder, dyeing cotton yellow green shades of very satisfactory properties to light, yielding on careful reduction with stannous chloride and hydrochloric acid among other products the compound having in its free form the probable formula:

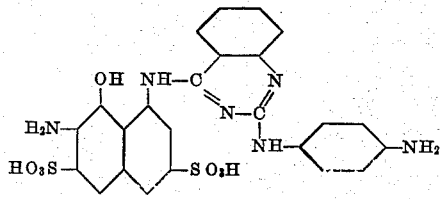

In testimony whereof we have hereunto set our hands.
WINFRID HENTRICH.
MAX HARDTMANN.
RUDOLF KNOCHE.
JOSEF HILGER.